United States Patent
Andersen (10) Patent No.: US 7,024,941 B2
(45) Date of Patent: Apr. 11, 2006

(54) METHOD OF MOUNTING A SENSOR ARRANGEMENT IN A TUBULAR MEMBER, AND USE OF THE METHOD

(75) Inventor: Martin Andersen, Nakskov (DK)

(73) Assignee: NKT Flexibles I/S, Brondby (DK)

( * ) Notice: Subject to any disclaimer, the term of this patent is extended or adjusted under 35 U.S.C. 154(b) by 96 days.

(21) Appl. No.: 10/476,721

(22) PCT Filed: Apr. 30, 2002

(86) PCT No.: PCT/DK02/00275

§ 371 (c)(1),
(2), (4) Date: Apr. 19, 2004

(87) PCT Pub. No.: WO02/088659

PCT Pub. Date: Nov. 7, 2002

(65) Prior Publication Data

US 2004/0168521 A1 Sep. 2, 2004

(30) Foreign Application Priority Data

Apr. 30, 2001 (DK) ................................ 2001 00670

(51) Int. Cl.
*G01B 7/16* (2006.01)
(52) U.S. Cl. ........................................................ 73/775
(58) Field of Classification Search ................. 73/775, 73/776, 768
See application file for complete search history.

(56) References Cited

U.S. PATENT DOCUMENTS

| 4,547,327 | A | * | 10/1985 | Bruins et al. | .................. | 264/16 |
| 5,313,849 | A | * | 5/1994 | Miyata et al. | .............. | 73/866.5 |
| 5,661,245 | A | * | 8/1997 | Svoboda et al. | .............. | 73/726 |
| 5,921,285 | A | | 7/1999 | Quigley et al. | | |
| 6,098,357 | A | * | 8/2000 | Franklin et al. | ............ | 52/223.7 |
| 2004/0018421 | A1 | * | 1/2004 | LaFollette et al. | .......... | 429/122 |

* cited by examiner

*Primary Examiner*—Max Noori
(74) *Attorney, Agent, or Firm*—Merchant & Gould (57) ABSTRACT

For use in the monitoring of a tubular member (1) having at least a helically wound reinforcement layer (10), the invention provides a method of mounting a sensor arrangement (17, 18), wherein the reinforcement layer is formed with a groove (16) which is filled with a liquid material (19), such as an epoxy type, and wherein the sensor arrangement is passed into the liquid material by means of a pressure applied by a roller prior to the solidification of the liquid material. In a preferred embodiment, the groove is formed in the reinforcement layer before this is helically wound on the tubular member. Hereby, the sensor arrangement is arranged well-protected without any risk of damage, which may e.g. occur if the tubular member is of the unbonded type, where the reinforcement layer may consist of two layers that may move relative to each other. Furthermore, the sensor arrangement is protected against the external mechanical impacts that may occur if the groove is provided in a reinforcement layer which is freely exposed to the surroundings. The invention is particular suitable for tubular members, including umbilicals that are used for the recovery, refining and transport of oil and gasses.

60 Claims, 4 Drawing Sheets

METHOD OF MOUNTING A SENSOR ARRANGEMENT IN A TUBULAR MEMBER, AND USE OF THE METHOD

The invention relates to a method of mounting a sensor arrangement in a tubular member, wherein at least a reinforcement layer is provided on the tubular member by helical winding. Moreover, the invention relates to a tubular member comprising a sensor arrangement.

The invention moreover relates to a use of the method and a tubular member comprising a sensor arrangement.

Tubular members of the said type, which are used inter alia for the transport of oil and gas, are well-described in the patent literature, and by way of example reference is made to JP 3265781, FR 2764669 and WO 00/36324.

The pipes are widely used for many different purposes in the offshore industry.

An ordinary use is for the transport of water, gas and crude oil between installations at an oil field, or in connection with the loading/unloading and transport of oil products. Such pipes are also called flow-lines, risers or jumpers.

Another use is for the transport of process liquids and hydraulic oil and for the carrying of light and power from an installation positioned at the surface of the sea and down to the oil wells on the seabed.

This type of pipes is not directly involved in the transport of oil and gas, but is necessary for the supply of the process liquids which, as mentioned, are to be used for the recovery of oil, as well as for the running of hydraulic pipes, electrical wires, fibre optics, etc. This type of pipes is called umbilicals in the technical jargon.

Also known are pipes that consist of combinations of one or more umbilicals with e.g. a riser, an integrated production umbilical or an integrated service umbilical.

In connection with tubular members of the above-mentioned type for offshore use which are composed of several layers, some of which are tensile and/or compressive reinforcement layers, it is desirable to be able to detect the mechanical impacts on the pipe along its length, which may comprise great and unpredictable forces or very varying temperature impacts.

Sensors of the strain gauge type are frequently used for measuring forces that cause mechanical deformations, in which strain gauges the electrical resistance in a conductor is changed by a mechanical impact.

Moreover, sensors are known where changes in the properties of an optical component caused by mechanical deformations or temperature variations are monitored.

In connection with the use of the above-mentioned type of sensors for monitoring flexible pipes that may be several kilometers long, it is necessary, of course, to run lines and/or optical fibres such that the recordings of the sensors may be monitored.

Sensors and transmission lines will hereinafter be referred to as a sensor arrangement.

Clearly, the use of sensor arrangements of the above-mentioned type for monitoring flexible pipes requires that they be mounted well-protected so that they are not damaged in use.

In connection with flexible pipes where the structure of the pipes is of the so-called unbonded type, i.e. the structure comprises several layers, the layers must be capable of moving relative to each other in order for the pipe to remain flexible.

Therefore, if the sensor arrangement was disposed freely between the layers, it would quickly be damaged.

In view of this, the object of the invention is to provide a method of mounting a sensor arrangement, ensuring that the sensor arrangement is well protected against undesirable mechanical impacts and is thus operationally reliable during the service life of the flexible pipe.

This object is achieved by the invention as defined in the claims.

In a first aspect, the invention relates to a method of mounting a sensor arrangement in a tubular member, wherein at least a reinforcement layer is provided on the tubular member by helical winding of an armor wire in such a way that the armor wire constitutes the reinforcement layer. The method comprises the steps of:
a) providing at least one groove in the armor wire,
b) filling the groove with a liquid material
c) placing the sensor arrangement in the at least one groove to thereby bringing the sensor arrangement into contact with the liquid material, and
d) fixing the sensor arrangement in the groove by solidifying the liquid material.

The sensor arrangement is hereby "concealed" in the reinforcement layer in such a manner that impacts caused by a movement between the layers of the pipes have no harmful effect on the sensor arrangement, whereas the impacts that should desirably be recorded, such as temperature or tensile stresses, may be recorded.

It is possible to provide the groove before initiating the helical winding, and, moreover, to perform the entire mounting of the sensor arrangement in the reinforcement layer so that the finish-mounted sensor arrangement may e.g. be stored on a coil before it is used as a pipe reinforcement. Thus, the armor wire, which constitutes the reinforcement layer when wound around the tubular member, may be stored on a coil while comprising integrated sensor arrangements. Moreover the material of the armor wire is also the material of the reinforcement material.

This may be an advantage if the reinforcement of a pipe is to be wound at a location where there are no technical facilities for mounting the sensor arrangement in the reinforcement layer.

As mentioned above, it is preferred that the reinforcement layer is a helical wound armor wire, e.g. of a metal such as steel, which constitutes the reinforcement layer, and optionally a tensile armor wire which constitutes the reinforcement layer. A metal or steel armor wire provides sufficient strength to the tubular member and grooves may relatively easy be formed in a metal or steel armor wire with ordinary metal or steel processing tools. In a preferred embodiment, the one or more grooves are provided in the longitudinal direction of the armor wire.

Preferably the groove has a width of 0,5–5 mm and a depth of 0,5–5 mm and it is moreover preferred the groove is substantially U-shaped in the longitudinal direction. Thereby the groove more easily receives the sensor arrangement, and less stress is induced into the reinforcement material by formation of the groove.

Consequently it is preferred that the one or more grooves are formed by cutting or rolling. However the grooves may also be formed during manufacturing of the armor wire or wires, which constitute the reinforcement layer, e.g. during casting or molding.

The sensor arrangement may be brought into contact with the liquid by immersing the sensor arrangement into the liquid or optionally the liquid may be arranged in spots or in one or more lines along the bottom of the groove. The liquid and the filling of the liquid into the groove will be described in further detail later.

A preferred embodiment of the method according to the invention includes at least one groove, which groove comprises a bottom portion having lower groove walls and an upper portion having upper groove walls. The bottom portion is capable of containing the widest part of the sensor arrangement after the sensor arrangement has been placed in the groove. Furthermore, the method comprises the step of deforming the upper portion of the groove so that the upper walls of the groove are brought closer to each other than the width of the widest part of the cross section of the sensor arrangement. Thus, it is possible to fix the sensor arrangement in a simple mechanical manner, which may be an advantage when the liquid is not solidified. Moreover, a more stable fixation of the sensor arrangement in the groove is obtained.

In an alternative preferred embodiment of the method, one or both of the upper groove walls each are formed with at least one protrusion. The protrusion protrudes from the wall, prior to the deforming step, in a direction where it does not prevent the placing of the sensor arrangement. The one or more protrusions preferably constitute the part or parts of the upper wall or walls of the groove. In the deforming step, the upper walls of the groove (and protrusions) are brought closer to each other than the width of the widest part of the cross section of the sensor arrangement.

The embodiment provides another method of fastening the sensor arrangement in the grooves in a simple mechanical way by deforming a protrusion integrated with the groove. The protrusion is formed at the upper portion of the groove close to or integrated with the surface of the armor wire. The protrusion is advantageously formed in the same process as the one or more grooves. The protrusion may be formed to run continuously along the grooves or as interrupted discrete protrusions. The upper walls of the groove or protrusion may be deformed in any known way, selected according to material of the reinforcement layer in which the groove and optional protrusion are formed. Preferably, the upper groove wall or protrusion is deformed by pressure e.g. using rollers. Preferably, the upper groove walls are deformed to partly or totally surround the sensor arrangement, thereby securing a good fixation of the sensor arrangement in the groove. Moreover, in a relatively simple and uncomplicated embodiment the protrusions are constituted by edges formed at the upper portion of the groove.

In a preferred embodiment, the upper groove walls are deformed prior to the application of the sensor arrangement in the armor wire. The upper groove walls are deformed to a point where it is still possible to place the sensor arrangement in contact with the liquid in the groove, preferably by pressing the sensor arrangement through the deformed upper groove walls. To facilitate the placing of the sensor arrangement in the groove, the upper groove walls may be only partially deformed or the deformations may be formed as discrete deformations with a certain space between neighbouring deformations. In one embodiment, the deformed upper groove walls only have to keep the sensor arrangement in a fixed position until the liquid has solidified, and the required fixing ability of the deformed groove walls is only temporary. Consequently no pressure needs to be applied to the grooves after placing the sensor arrangement in the grooves, and undesired damage to the sensor arrangement due to pressure can be avoided.

However, for many purposes it is preferred that the upper groove walls are deformed after the application of the sensor arrangement in the armor wire. In this embodiment, it is relatively easy to place the sensor arrangement in the groove and a good fixation is obtained. The deformation may be performed all along the groove or only partially along the extension of the groove in the longitudinal direction. If the deformation is performed all along the groove, the best possible fixation is obtained.

According to the invention, the sensor arrangement is fixed and anchored in a solidified liquid. The liquid selected is able to adhere both to the sensor arrangement and the reinforcement material. Moreover, the selected liquid has properties in the solidified state, which provide sufficient flexibility to allow the solidified liquid to be formed into helical windings corresponding to the helical windings of the armor wire forming the reinforcement layer. Preferred liquids will be described in further detail later.

The sensor arrangement may expediently be immersed into the liquid material and, preferably, it is immersed into the liquid material by the action of a wheel positioned above the groove, said wheel having a face which is pressed against the sensor arrangement, following which the wheel immerses the sensor arrangement into the liquid material by pressure impact. The location of the sensor arrangement in the liquid material may hereby be controlled so as to achieve the most optimum location.

For the mounting of sensor arrangements where no ultimate protection of against mechanical impacts is required, the sensor arrangement may preferably be mounted in liquid material, which is deposited pointwise in the groove, like discrete dots of liquid material. Moreover, the sensor arrangement may be only partially immersed in the liquid.

These preferred embodiments result in a saving of material, and it is easier to make repairs on damaged pipes, since a portion of the sensor arrangement is located freely in the groove, which makes it relatively easy to make splices, etc. in the sensor arrangement.

According to the invention it is preferred that the liquid is a polymer material. Preferably the polymer material is thermoplastic plastics and/or thermosetting plastics. By the term plastics is understood polymer material, which is able to undergo plastic deformation in the liquid state, but also, at least partially, in the solidified state. Thus, the solidified material poses flexibility and is able to withstand deformation and twisting without cracking or loosening from the grooves in the reinforcement material.

Preferred polymer types for the polymer material are an epoxy type, a vinyl ester epoxy, a polyurethane or mixtures containing one or more of these. Said polymers fulfil the requirements of the liquid according to the invention. However, other liquids fulfilling the requirements may also be used according to the invention. The skilled person will be able to select suitable liquids to be used according to the invention as a matter of routine.

The polymer material may preferably be fluorinated completely or partly. Such treatment may improve the properties of the polymer material with regard to wear resistance, chemical resistance and resistance towards elevated temperatures.

Furthermore, it is preferred that the polymer material is cross-linked completely or partly. Cross-linking may improve strength and may be initiated by heat, peroxides or other chemicals e.g. sulphur compounds.

In a preferred embodiment according to the invention, the one or more grooves are coated with a coating layer after placing and/or fixation of the sensor arrangement in the one or more grooves. The coating layer may impart desired properties to the surface of the reinforcement layer and additionally protect the sensor arrangement in the groove.

The coating layer may comprise metallic and polymeric material and may be attached by heat, hot melting, gluing etc.

An embodiment of the method according to the invention, which is preferred for some purposes, comprises the steps of:
a) providing at least one groove in the armor wire,
b) forming at least one protrusion at the upper portion of the groove,
c) filling liquid material into the groove,
d) immersing the sensor arrangement into the liquid material,
e) deforming the upper portion of the groove so that the at least one protrusion partly surrounds the sensor arrangement, thereby keeping the sensor arrangement in a fixed position, and
f) solidifying the liquid material.

The embodiment is useful when a very strong fixation of the sensor arrangement in the groove is required.

In a further aspect, the invention also relates to a method of mounting a sensor arrangement in a tubular member, wherein at least a reinforcement layer is provided on the tubular member by helical winding of an armor wire, which method comprises the steps of:
 i. providing at least one grooves in the armor wire, which groove comprises a bottom portion having lower groove walls and an upper portion having upper groove walls,
 ii. placing the sensor arrangement in the groove,
 iii. deforming the upper portion of the groove so that the upper groove walls are brought closer to each other than the width of the widest part of the cross section of the sensor arrangement contained in the groove after the sensor arrangement is placed in the groove, and where the bottom portion is capable of containing the widest part of the cross section of the sensor arrangement.

The method provides a tubular member with at least one sensor arrangement, which is integrated and protected in the armor wire constituting a reinforcement layer on the tubular member by use of only mechanical fastening.

Preferably step i. is performed before the helical winding is initiated, preferably at least the steps i. and ii. or the steps i. and iii., more preferably all the steps i.–iii. are performed before the helical winding is provided. Thereby it is possible to optimize the conditions for the manufacturing of the tubular member.

In order to obtain the best properties of the reinforcement layer it is preferably constituted by an armor wire, which may be made of a metal, such as steel. Moreover, it is preferred that the groove is provided in the longitudinal direction of the armor wire, which results in that the sensor arrangement is wound up helically around the tubular member with the armor wire.

Preferably, the method comprises the further step of filling a liquid into the groove and placing the sensor arrangement in the liquid and solidifying the liquid. Hereby a much stronger fixation of the sensor arrangement is obtained.

In a preferred embodiment one or both of the upper groove walls each are shaped to have at least one protrusion. The protrusion is protruding from the wall prior to the deforming step in a direction where it does not prevent the placing of the sensor arrangement, and the one or more protrusions preferably constitute the part or parts of the upper groove wall which in the deforming step are brought closer to each other to have a mutual spacing, which is shorter than the width of the widest part of the cross section of the sensor arrangement. Thus the sensor arrangement may easily be placed in the groove and a strong fixation may be obtained.

Preferably, the upper groove walls are deformed by pressing the walls closer to each other, preferably by pressing from the outer surface of the armor, e.g. by use of rollers. By selecting suitable rollers and pressure to be applied it is possible to deform the walls of the grooves in such a way that they are closing around and fixing the sensor arrangement, and preferably the upper groove walls are deformed to partly or totally surround the sensor arrangement, thereby keeping the sensor arrangement in a fixed position.

According to the method it may for some purposes be preferred that the upper groove walls are deformed prior to the application of the sensor arrangement in the armor wire. When the upper groove walls are deformed before the sensor arrangement is placed in the groove, the sensor arrangement of course has to be pressed down into the groove while passing the deformed upper groove walls. Preferably, the upper groove walls are not deformed in the entire extension, but only in sections. This will facilitate the placing of the sensor arrangement in the groove. Moreover, if the embodiment is used in combination with a liquid, with which the sensor arrangement is brought into contact whereafter the liquid is solidified for fixing the sensor arrangement, the fixation ability of the deformed walls does not have to be very high. In such case, the deformed walls only have to provide a temporary fixation.

Alternatively, it is preferred that the upper groove walls are deformed after the application of the sensor arrangement in the armor wire. In this embodiment it is easier to place the sensor arrangement in the groove. Furthermore, the grooves may be deformed in their entire extension to obtain a good fixation. Although use of solidified liquid is not required in such a situation, it may be preferred in order to obtain a very strong and stable fixation of the sensor arrangement.

In a preferred embodiment, a liquid material is filled into the groove, pointwise or continuously, along the length of the groove after the sensor arrangement has been applied in the groove. The liquid is then solidified to give a further fixation of the sensor arrangement.

Preferably the sensor arrangement is applied into the groove by the action of a wheel disposed above the groove. The wheel has a face, which is pressed against the sensor arrangement to place the sensor arrangement in the groove. Hereby the sensor arrangement can be placed in the groove by use of relatively simple mechanical means.

The liquid to be solidified is preferably a polymer material, and preferably selected from the group of thermoplastic plastics, such as an epoxy type, a vinyl ester epoxy, a polyurethane or mixtures containing one of these, and thermosetting plastics.

Moreover, to obtain better strength and resistance against temperature and environment, the polymer material is preferably fluorinated completely or partly. Furthermore, in order to obtain better strength, the polymer material, when solidifying, is preferably cross-linked completely or partly.

In a preferred embodiment of the method according to the invention, the groove has a width of 0,5–5 mm and a depth of 0,5–5 mm, and preferably the groove is U-shaped in the longitudinal direction. The groove is then capable of housing most known sensor arrangements and the U-shape ensures that a minimum of stress is induced into the armor wire due to the groove. The groove is preferably formed by cutting or milling. Optionally, the groove is formed during the manufacture of the armor wire.

Preferably the groove or the grooves are coated with a coating layer after placing and/or fixation of the sensor arrangement in the groove. The coating layer may impart desired properties to the surface of the reinforcement layer and additionally protect the sensor arrangement in the groove. The coating layer may comprise metallic and polymeric material and may be attached by heat, hot melting, gluing etc.

Optionally the sensor arrangement may also be fixed in the groove by use of clamps, screws, tape or similar fastening devices, at least temporarily. Furthermore, the embodiments of fastening the sensor arrangement in a groove may be combined in any desired way.

As mentioned, the invention also relates to a use.

This use is preferably for tubular members of the following types:
- for the transport of water, gas and crude oil between installations at an oil field
- for the transport of process liquids from an installation located at the surface of the sea and an oil well located below the surface of the sea
- for the transport of force-transferring fluids
- umbilicals, and combinations of these.

In a further aspect, the invention also relates to a tubular member comprising a sensor arrangement and at least one reinforcement layer provided on the tubular member by helical winding, wherein a sensor arrangement is integrated or concealed in one or more grooves in the reinforcement layer by use of adhesion to the groove and/or by a deformation of the groove.

Consequently the invention also relates to a tubular member obtainable by any one of the methods described above.

The invention will now be explained more fully with reference to the embodiment illustrated in the drawings, in which

Figure 1:
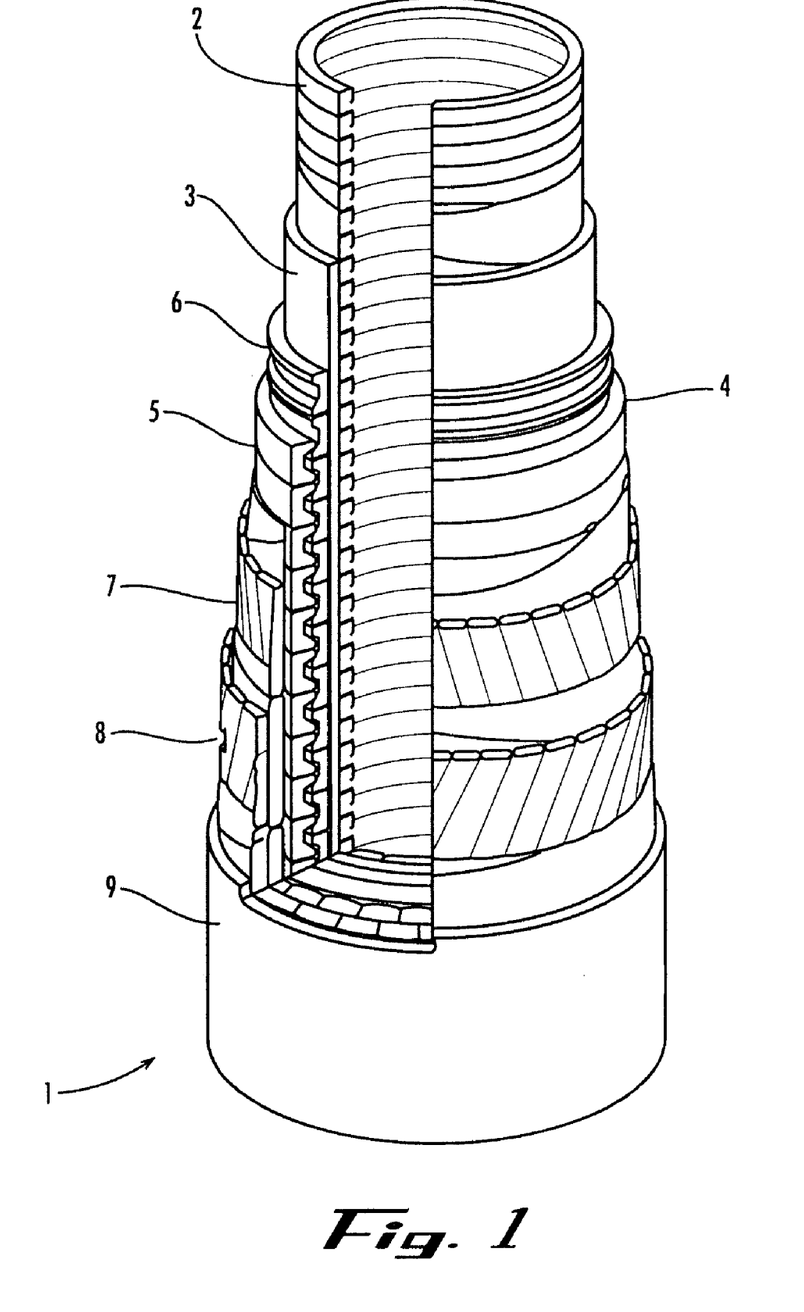
FIG. 1 shows the structure of a typical pipe for the transport of oil and gas.

FIG. 1 shows an ordinary flexible pipe for use in the transport of oil and gas.

The pipe is composed of a carcass 2 around which an inner liner 3 is provided, said liner being tight or diffusion tight so that no or only little transport can take place from the interior of the pipe outwards towards the surroundings, or vice versa. The carcass 2 is not tight, but its function is to prevent the inner liner 3 from collapsing because of great external pressures which may occur e.g. as hydrostatic pressures at great depths of water. Also the carcass may be used for protection against abrasion.

Externally wound onto the inner layer is a pressure reinforcement layer which, as shown here, consists of joined C-profiles 5, 6. It is also possible to use other profiles, such as K-, Z- or X-profiles which are joined with profiles of another type.

Externally applied to the reinforcement layer is a tensile reinforcement layer which, as shown, consists of helically wound profiles 7, 8, which are wound opposite each other at suitable angles, such as 20–55°, relative to the longitudinal axis of the pipe.

Finally, externally arranged onto the reinforcement layer is a tight jacket 9, which, however, may be omitted in some pipe structures.

Figure 2A:
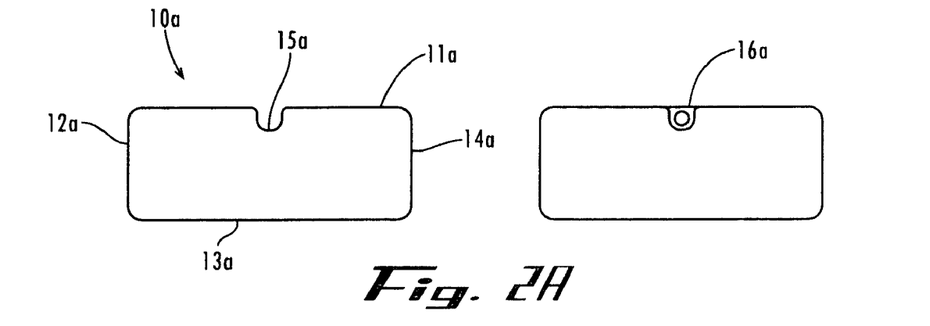
FIGS. 2A–2D show cross-sectional profiles of reinforcement elements for use as a reinforcement layer, and with sensor arrangements mounted according to the invention.
Figure 2B:
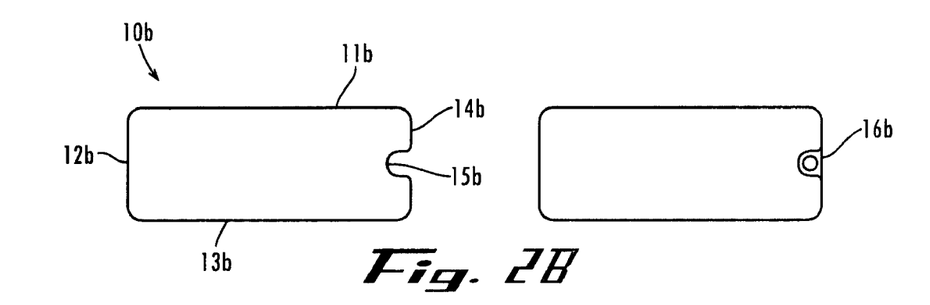

FIGS. 2A–2B show embodiments of tensile reinforcement profiles in cross-section, e.g. of the type which is shown at the reference numerals 7 and 8 in FIG. 1, but are designated 10a–10d in FIGS. 2A–2D.

In FIGS. 2A–2D, the same reference numerals are used for the same parts, but with an added letter a, b, c or d, referring to FIG. 2A, 2B, 2C or 2D.

As seen at the left-hand side of FIGS. 2A–2D, the profiles are formed with grooves, while the right-hand side of the figures shows the same profiles, but now with one or more sensor arrangements mounted according to the invention.

FIG. 2A shows a tensile reinforcement profile which is generally designated 10a. The profile has four faces which, in cross-section, are designated 11a, 12a, 13a and 14a, and, as will be seen, the faces 11a and 13a are wider than the faces 12a and 14a. The face 11a is formed with a groove 15a, which is adapted to receive a sensor arrangement 16a, see the right-hand side of FIG. 2A.

This sensor arrangement, which is positioned in the bending plane of the helical winding, is particularly suitable for use in temperature measurements, but may also be used for measuring variations in the strains which occur on the reinforcement element because the pipe contracts or expands relative to a neutral value, which is defined as the value that occurs when the helical winding has been completed in a rest position on the pipe and forming a part of the reinforcement layer.

If, e.g. a very large tension occurs longitudinally of the axis of the pipe, then the sensor arrangement will sense it because of the loading of the reinforcement element caused by this tension.

FIG. 2B shows the same profile as in FIG. 2A, but now formed with a groove 15b which is positioned on one of the short faces, here shown at the face 14b, and with a sensor arrangement 16b in the groove 15b.

In this case, the sensor arrangement 16b is positioned externally of the bending plane of the helical winding, which means that it is suitable for measuring a bend that occurs when the reinforcement element is rotated relative to its longitudinal axis. Further, temperature may also be measured, of course, if the sensor arrangement contains a temperature sensor.

Figure 2C:
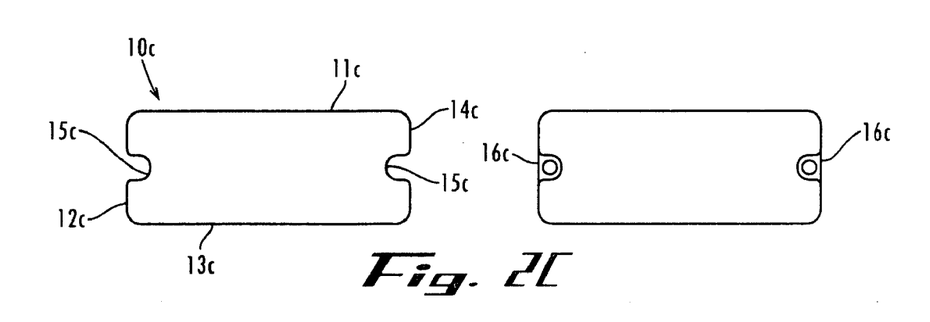

FIG. 2C shows the profile of FIG. 2B, but now with two grooves which are designated 15c, each of which receives sensor arrangements 16c.

In this case, the state of stress of the reinforcement element may be determined with two components, viz. a first component that originates from axial deformation, and a component that originates from bending around the normal plane to the plane that is spanned by the two sensors.

In this case, too, the sensor arrangement may contain temperature meters, of course.

Figure 2D:
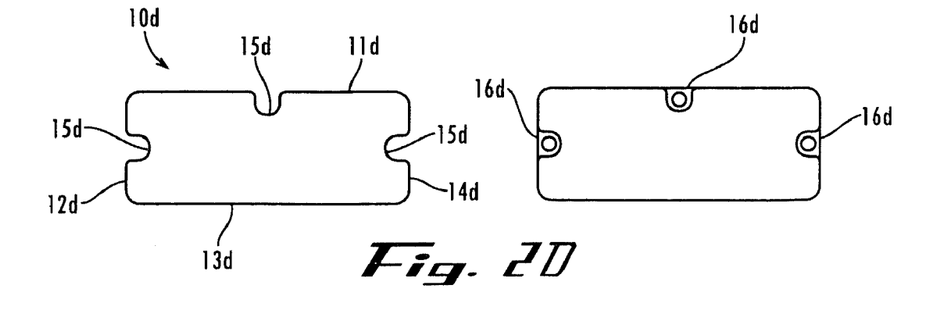

Finally, FIG. 2D shows the profile of FIG. 2C, but now with three grooves 15d formed in the side faces 11d, 12d and 14d, and with sensor arrangements 16d in the grooves 15d. With this structure, it will be possible to measure the axial deformation of the reinforcement element and its complete extension in two planes as well as temperatures, if desired.

The mode of operation of the sensor arrangement will now be explained with reference to FIG. 3, which shows a structure of sensor arrangements corresponding to the one in FIG. 2d.

Figure 3:
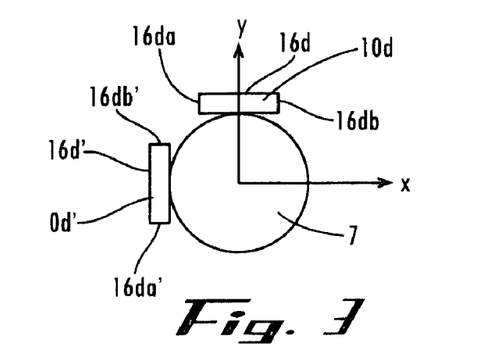
FIG. 3 shows a greatly distorted arrangement of sensors on a flexible pipe corresponding to the sensor setup shown in FIG. 2D.

FIG. 3 shows a greatly distorted plane section through a flexible pipe, where 1 designates the pipe structure around which the reinforcement elements are wound.

In the figure, 10d and 10d' indicate reinforcement elements.

Moreover, the individual sensor arrangements are designated 16d, 16da, 16db, 16d', 16da' and 16db'.

Note that the axis of the pipe is not parallel with the axis of the reinforcement elements, as the reinforcement elements are twisted in a helix around the axis of the pipe. This means that the reinforcement element 10d' protrudes from the plane of the paper, and owing to the twist the groove and thereby the position of the sensor arrangements in 10d' is rotated relative to the location where the reinforcement element is designated 10d.

If it is assumed that the section through the pipe is made where the sensor arrangement is positioned, and if it is moreover assumed for reasons of understanding that the reinforcement elements are secured to the pipe structure, bending of the pipe around the shown X-axis will mean that the sensor arrangements 16d, 16da and 16db will record substantially the same change in the state of strain of the reinforcement element, as, in this position, the reinforcement element is subjected to a pure tension.

In contrast, bending around the X-axis cannot be recorded by the sensor arrangement 16d', since 16d' is positioned in the bending-neutral axis of the pipe, and therefore the effective strain is zero here.

Also, the sum of the recorded strains of the sensor arrangements 16da' and 16db' will be zero, since 16da' and 16db' are subjected to the same flexural tension, just with the opposite sign. Clearly, the reinforcement elements according to this invention need not be rigidly fixed, but may slide across the pipe structure.

In this case, the above explanation will only apply approximately.

If the structure is subjected to compression, the reinforcement element may deflect in an uncontrolled manner. If e.g. a local bulging takes place away from the pipe, this will be recorded in that the reading of the 16d and 16d' sensors is not the same as the average of the reading of the 16da, 16db and 16da', 16db' sensors.

Figure 4:
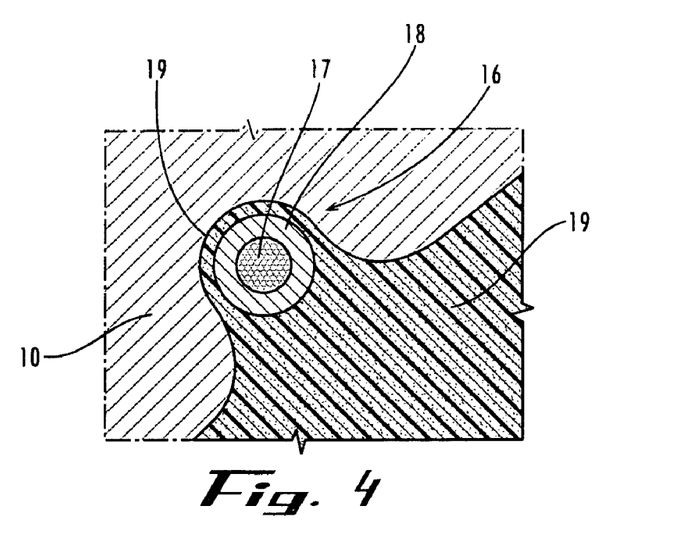
FIG. 4 is a cross-sectional, detailed and enlarged view of a sensor arrangement according to the invention which is mounted in a reinforcement element.

FIG. 4 shows in an enlarged view how a sensor arrangement according to the invention is mounted in a groove, as is explained in connection with FIGS. 2A–2D.

10 designates a portion of a reinforcement profile, as shown in FIGS. 2A–2D.

This is formed with a groove 16 where a sensor arrangement 17, 18, by way of example, is embedded by means of a material 19.

This material 19 is introduced into the groove 16 in a liquid state, and then the sensor arrangement 17, 18 is immersed into the material. The sensor arrangement may consist of an outer pipe 18, in which a fibre 17 extends, said fibre being connected to an optical measuring component at suitable distances longitudinally of the pipe 18. There may also be electrical conductors in the steel pipe, which are connected to a strain gauge.

Such sensor arrangements are generally known and will therefore not be described more fully, as the details in connection with these have no importance to the understanding of the invention.

The liquid material used may be many different types of polymer materials, such as thermoplastic plastics, thermosetting plastics, epoxy types, vinyl ester epoxy, polyurethane or mixtures of these.

Moreover, the polymer materials may be fluorinated completely or partly and may be cross-lined completely or partly.

Figure 5:
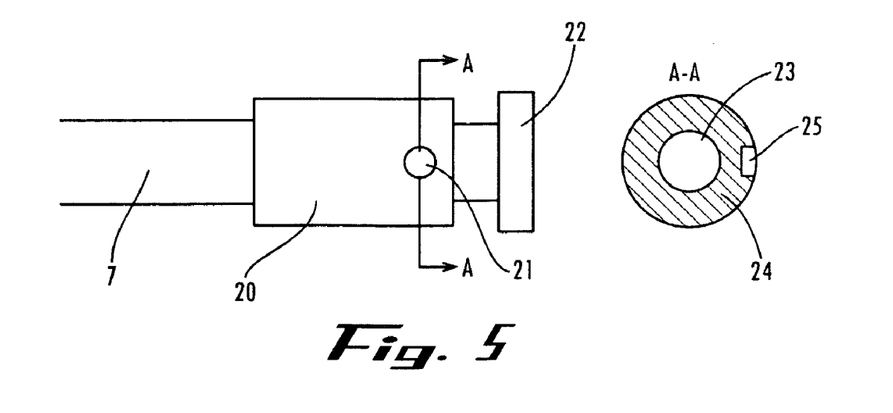
FIG. 5 shows an end termination with a discharge duct for a sensor arrangement according to the invention.

FIG. 5 shows an example of an end termination, which is intended as a tap for a sensor arrangement mounted on a flexible pipeline.

The figure shows the flexible pipe of FIG. 1, but now with a sensor arrangement (not shown) according to the invention and mounted on an end termination 20, 22. This end termination consists of a housing 20 which is adapted to receive the pipe 1, and of an anchoring part 22 which is secured at one end to a termination point (not shown) and at the other end to the housing 20.

The housing 20 is formed with a hole 21 through which optical fibres or electrical conductors from the sensor arrangement extending in the cable may pass.

As will be seen at the right-hand side of FIG. 4, optical fibres and electrical conductors run via a duct 25 in the housing 22 which is connected with one or more grooves in the tensile reinforcement of the cable.

Although FIG. 5 has been explained in connection with an end termination, nothing, of course, prevents the same constructional principles from being applied in connection with a bushing in which two cables are interconnected.

Figure 6:
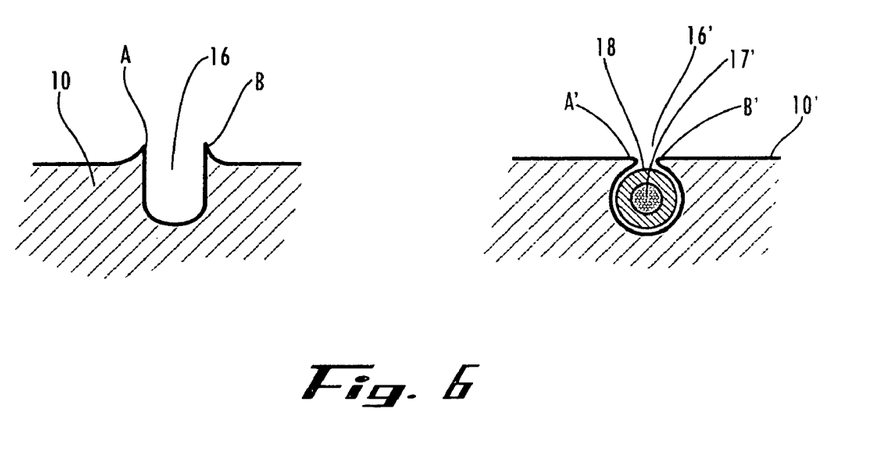
FIG. 6 shows a cross-sectional and enlarged view of an embodiment of the invention in which the sensor arrangement is fixed by deformed protrusions.

FIG. 6 discloses the principle of the embodiment of fixing the sensor arrangement in the groove by deforming protrusions. The reinforcement profile 10, similar to the profiles of FIG. 2, is formed with an U-shaped groove 16 comprising protrusions A and B at the upper portion. The protrusions A and B may optionally be formed when the groove 16 is cut or when the reinforcement profile 10 is manufactured.

In the reinforcement profile 10' a sensor arrangement 17, 18, comprising fibre 17 and an outer pipe 18, has been placed in the groove 16'. The protrusions A' and B' are deformed into the groove 16', thereby fixing the sensor arrangement in the groove 16'. In the embodiment shown in FIG. 6, two protrusions A' and B' are used to fix the sensor arrangement. It is, however, understood the sensor arrangement may be fixed by use of only one protrusion A', if desired. Although the protrusions A and B have been drawn to be very significant in FIG. 6, the protrusion may in principal be the edges on the upper portion of the groove 16.

The invention claimed is:

1. A method of mounting a sensor arrangement in a tubular member, wherein at least a reinforcement layer is provided on the tubular member by helical winding of an armor wire, said armor wire being provided with at least one groove wherein said groove comprises a bottom portion having lower groove walls and an upper portion having upper groove walls, said bottom portion being capable of containing the widest part of the sensor arrangement, said method comprising the steps of:
   a) filling the groove with a liquid material
   b) placing the sensor arrangement in the at least one groove to thereby bring the sensor arrangement into contact with the liquid material,
   c) fixing the sensor arrangement in the at least one groove by solidifying the liquid material, and
   d) deforming the upper portion of the groove so that the upper groove walls are brought closer to each other than the width of said widest part of the cross section of the sensor arrangement.

2. A method according to claim 1 wherein step a) is performed before the helical winding is initiated.

3. A method according to claim 1, wherein at least the steps a–c), preferably the steps a–d) are performed before the helical winding is provided.

4. A method according to claim 1 wherein the reinforcement layer is constituted by a metal armor wire, preferably a steel armor wire.

5. A method according to claim 1 wherein said at least one groove is provided in the longitudinal direction of the armor wire.

6. A method according to claim 1 wherein one or both of the upper groove walls each are shaped to have at least one protrusion, said protrusion being protruding from the wall prior to the deforming step in a direction where it does not prevent the placing of the sensor arrangement, said one or more protrusions preferably constituting the part or parts of the upper groove wall which in the deforming step are brought closer to each other than the width of said widest part of the cross section of the sensor arrangement.

7. A method according to claim 6 wherein the upper groove walls are deformed by pressing the walls closer to each other, preferably by pressing from the outer surface of the armor, e.g. by use of rollers.

8. A method according to claim 6 wherein the upper groove walls are deformed to partly or totally surround the sensor arrangement.

9. A method according to claim 6 wherein the upper groove walls are deformed prior to the application of the sensor arrangement in the armor wire.

10. A method according to claim 6 wherein the upper groove walls are deformed after the application of the sensor arrangement in the armor wire.

11. A method according to claim 1, wherein the sensor arrangement is immersed into the liquid material by the action of a wheel disposed above the groove, said wheel having a face which is pressed against the sensor arrangement, following which the wheel immerses the sensor arrangement into the liquid material by pressure impact.

12. A method according to claim 1, wherein the liquid material is deposited pointwise in the groove.

13. A method according to claim 1, wherein the sensor arrangement is only partially immersed in the liquid.

14. A method according to claim 1, wherein the liquid is a polymer material.

15. A method according to claim 14, wherein the polymer material is thermoplastic plastics.

16. A method according to claim 14, wherein the polymer material is thermosetting plastics.

17. A method according to claim 14, wherein the polymer material is an epoxy type, a vinyl ester epoxy, a polyurethane or mixtures containing one of these.

18. A method according to claim 15, wherein the polymer material is fluorinated completely or partly.

19. A method according to claim 15, wherein the polymer material in the solidifying step is cross-linked completely or partly.

20. A method according to claim 1 wherein the groove has a width of 0,5–5 mm and a depth of 0,5–5 mm and preferably the groove are U-shaped in the longitudinal direction.

21. A method according to claim 1 wherein the at least one groove is formed by cutting or milling.

22. A method according to claim 1 wherein the at least one groove is coated with a coating layer after placing and/or fixation of the sensor arrangement in the at least one groove.

23. A method according to claim 1 comprising the steps of:

e) providing at least one groove in the armor wire,
f) forming at least one protrusion at the upper portion of the at least one groove,
g) filling liquid material into the at least one groove,
h) immersing the sensor arrangement into the liquid material,
i) deforming the upper portion of the groove so that the at least one protrusion partly surrounds the sensor arrangement, thereby keeping the sensor arrangement in a fixed position, and
f) solidifying the liquid material.

24. A method of mounting a sensor arrangement in a tubular member, wherein at least a reinforcement layer is provided on the tubular member by helical winding of an armor wire, said method comprising the steps of:
i) providing at least one groove in the armor wire, said groove comprising a bottom portion having lower groove walls and an upper portion having upper groove walls,
ii) placing the sensor arrangement in the at least one groove,
iii) deforming the upper portion of the groove so that the upper groove walls are brought closer to each other than the width of the widest part of the cross section of the sensor arrangement contained in the groove after the sensor arrangement is placed in the groove,
wherein said bottom portion is capable of containing said widest part of the sensor arrangement.

25. A method according to claim 24 wherein step i. is performed before the helical winding is initiated, preferably at least the steps i. and ii. or the steps i. and iii., more preferably all the steps i.–iii. are performed before the helical winding is provided.

26. A method according to claim 24 wherein the reinforcement layer is constituted by an armor wire preferably of a metal, such as steel.

27. A method according to claim 24 wherein said at least one groove is provided in the longitudinal direction of the armor wire.

28. A method according to claim 24 comprising the further step of filling a liquid into the groove before placing the sensor arrangement in the groove, whereby the sensor arrangement is immersed in the liquid and in a subsequent step the liquid is solidified.

29. A method according to claim 24 wherein one or both of the upper groove walls each are shaped to have at least one protrusion, said protrusion being protruding from the wall prior to the deforming step in a direction where it does not prevent the placing of the sensor arrangement, said one or more protrusions preferably constituting the part or parts of the upper groove wall which in the deforming step are brought closer to each other than the width of said widest part of the sensor arrangement.

30. A method according to claim 24 wherein the upper groove walls are deformed by pressing the walls closer to each other, preferably by pressing from the outer surface of the armor, e.g. by use of rollers.

31. A method according to claim 24 wherein the upper groove walls are deformed to partly or totally surround the sensor arrangement.

32. A method according to claim 24 wherein the upper groove walls are deformed prior to the application of the sensor arrangement in the armor wire.

33. A method according to claim 24 wherein the upper groove walls are deformed after the application of the sensor arrangement in the armor wire.

34. A method according to claim 24, wherein a liquid material is filled into the groove pointwise or continuously along the length of the groove after the sensor arrangement has been applied in the groove.

35. A method according to claim 24, wherein said sensor arrangement is applied into the groove by the action of a wheel disposed above the groove, said wheel having a face which is pressed against the sensor arrangement to thereby place the sensor arrangement in the groove.

36. A method according to claim 28, wherein the liquid is a polymer material, preferably selected from the group of thermoplastic plastics, such as an epoxy type, a vinyl ester epoxy, a polyurethane or mixtures containing one of these, and thermosetting plastics.

37. A method according to claim 36, wherein the polymer material is fluorinated completely or partly.

38. A method according to claim 36, wherein the polymer material in the solidifying step is cross-linked completely or partly.

39. A method according to claim 24 wherein the groove has a width of 0,5–5 mm and a depth of 0,5–5 mm and preferably the groove are U-shaped in the longitudinal direction.

40. A method according to claim 24 wherein the at least one groove is formed by cutting or milling.

41. A method according to claim 24 wherein the at least one groove is coated with a coating layer after placing and/or fixation of the sensor arrangement in the at least one grooves.

42. A method of mounting a sensor arrangement in a tubular member, wherein at least a reinforcement layer is provided on the tubular member by helical winding of an armor wire, said method comprising the steps of:
j) providing at least one grooves in the armor wire,
k) filling the groove with a liquid material
l) placing the sensor arrangement in the at least one groove to thereby bring the sensor arrangement into contact with the liquid material, and
m) fixing the sensor arrangement in the at least one groove by solidifying the liquid material,
wherein the sensor arrangement is immersed into the liquid material by the action of a wheel disposed above the groove, said wheel having a face which is pressed against the sensor arrangement, following which the wheel immerses the sensor arrangement into the liquid material by pressure impact.

43. A method according to claim 42 wherein step a) is performed before the helical winding is initiated.

44. A method according to claim 42, wherein at least the steps a–c), preferably the steps a–d) are performed before the helical winding is provided.

45. A method according to claim 42 wherein the reinforcement layer is constituted by a metal armor wire, preferably a steel armor wire.

46. A method according to claim 42 wherein said at least one groove is provided in the longitudinal direction of the armor wire.

47. A method according to claim 42 wherein said groove comprises a bottom portion having lower groove walls and an upper portion having upper groove walls, said bottom portion being capable of containing the widest part of the sensor arrangement contained in the groove after the sensor arrangement is placed in the groove, said method comprising the further step of deforming the upper portion of the groove so that the upper groove walls are brought closer to each other than the width of said widest part of the cross section of the sensor arrangement.

48. A method according to claim 42, wherein the liquid material is deposited pointwise in the groove.

49. A method according to claim 42, wherein the sensor arrangement is only partially immersed in the liquid.

50. A method according to claim 42, wherein the liquid is a polymer material.

51. A method according to claim 50, wherein the polymer material is thermoplastic plastics.

52. A method according to claim 50, wherein the polymer material is thermosetting plastics.

53. A method according to claim 50, wherein the polymer material is an epoxy type, a vinyl ester epoxy, a polyurethane or mixtures containing one of these.

54. A method according to claim 51, wherein the polymer material is fluorinated completely or partly.

55. A method according to claim 51, wherein the polymer material in the solidifying step is cross-linked completely or partly.

56. A method according to claim 42 wherein the groove has a width of 0,5–5 mm and a depth of 0,5–5 mm and preferably the groove are U-shaped in the longitudinal direction.

57. A method according to claim 42 wherein the at least one groove is formed by cutting or milling.

58. A method according to claim 42 wherein the at least one groove is coated with a coating layer after placing and/or fixation of the sensor arrangement in the at least one groove.

59. Use of the method according to claim 1 for mounting of a sensor arrangement in a tubular members selected from the group consisting of tubular members:
for the transport of water, gas and crude oil between installations at an oil field,
for the transport of process liquids from an installation located at the surface of the sea and an oil well located below the surface of the sea,
for the transport of force-transferring fluids,
umbilicals, and
combinations of these.

60. A tubular member comprising a sensor arrangement and at least one reinforcement layer provided on the tubular member by helical winding, wherein said sensor arrangement is integrated or concealed in one or more grooves in the reinforcement layer by use of a deformation of the groove with or without use of adhesion, said one or more grooves comprises a bottom portion having lower groove walls and an upper portion having upper groove walls, said bottom portion being capable of containing the widest part of the sensor arrangement, said tubular member being obtainable by a method comprising the step of deforming the upper portion of the groove so that the upper groove walls are brought closer to each other than the width of said widest part of the cross section of the sensor arrangement.

* * * * *